(12) United States Patent
Gaeddert et al.

(10) Patent No.: US 9,629,307 B2
(45) Date of Patent: Apr. 25, 2017

(54) MOWER CUTTING CHAMBER WITH ADJUSTABLE DISCHARGE GEOMETRY

(71) Applicant: Excel Industries, Inc., Hesston, KS (US)

(72) Inventors: Thomas James Gaeddert, Newton, KS (US); Derek Jordan Christophel, Hesston, KS (US)

(73) Assignee: EXCEL INDUSTRIES, INC., Hesston, KS (US)

( * ) Notice: Subject to any disclaimer, the term of this patent is extended or adjusted under 35 U.S.C. 154(b) by 118 days.

(21) Appl. No.: 14/329,535

(22) Filed: Jul. 11, 2014

(65) Prior Publication Data

US 2015/0013298 A1     Jan. 15, 2015

Related U.S. Application Data

(60) Provisional application No. 61/845,740, filed on Jul. 12, 2013.

(51) Int. Cl.
*A01D 67/00* (2006.01)
*A01D 34/71* (2006.01)

(52) U.S. Cl.
CPC .................................. *A01D 34/71* (2013.01)

(58) Field of Classification Search
CPC .... A01D 34/71; A01D 34/001; A01D 34/667; A01D 34/81; A01D 2101/00
USPC .............................................. 56/320.1, 320.2
See application file for complete search history.

(56) References Cited

U.S. PATENT DOCUMENTS

| | | |
|---|---|---|
| 3,818,687 A | 6/1974 | Houst et al. |
| 5,090,183 A | 2/1992 | Thorud et al. |
| 5,205,112 A | 4/1993 | Tillotson et al. |
| 5,210,998 A * | 5/1993 | Hojo .................... A01D 34/005 56/255 |
| 5,305,589 A | 4/1994 | Rodriguez et al. |
| 5,465,564 A | 11/1995 | Koehn et al. |
| 6,192,666 B1 | 2/2001 | Sugden et al. |

(Continued)

FOREIGN PATENT DOCUMENTS

JP        3759019        3/2006

OTHER PUBLICATIONS

International Search Report and Written Opinion of the International Searching Authority for PCT/US2014/046376 dated Nov. 13, 2014.

*Primary Examiner* — Thomas B Will
*Assistant Examiner* — Mai Nguyen

(57) ABSTRACT

A mower deck includes at least one cutting chamber with a spindle-mounted rotary cutting blade. The cutting chamber includes an upper wall and a sidewall. The sidewall presents a discharge opening. A cut-off baffle extends between the spindle and the sidewall discharge opening. The cut-off baffle adjusts between an open position in which the discharge opening is at least partially unobstructed and a closed position in which more of the discharge opening is obstructed. A spreader plate lies over the upper corner of the cutting chamber near the discharge opening opposite the cut-off baffle. The spreader plate adjusts between a first retracted position spaced away from the discharge opening and a second extended position closer to the discharge opening. The cut-off baffle and the spreader plate may be adjusted to control the discharge of grass clippings from the cutting chamber.

6 Claims, 3 Drawing Sheets

(56) References Cited

U.S. PATENT DOCUMENTS

| | | |
|---|---|---|
| 6,330,783 B2 | 12/2001 | Oxley |
| 6,470,663 B2 | 10/2002 | Langworthy et al. |
| 7,093,415 B2 | 8/2006 | Kallevig et al. |
| 7,360,352 B2 * | 4/2008 | Samejima ............... A01D 34/71 56/320.1 |
| 7,574,852 B1 | 8/2009 | Loxterkamp et al. |
| 7,866,135 B2 | 1/2011 | Davis et al. |
| 8,132,396 B2 | 3/2012 | Minami et al. |
| 8,156,722 B2 | 4/2012 | Sugio et al. |
| 8,171,709 B1 | 5/2012 | Bedford et al. |
| 2003/0154705 A1 | 8/2003 | Sugden et al. |
| 2003/0217542 A1 | 11/2003 | Osborne |
| 2006/0042218 A1 * | 3/2006 | Plouraboue ............ A01D 34/81 56/320.2 |
| 2009/0282799 A1 * | 11/2009 | Kure ...................... A01D 34/71 56/320.2 |
| 2010/0307123 A1 * | 12/2010 | Minami ............... A01D 42/005 56/320.2 |
| 2011/0239616 A1 * | 10/2011 | Shimozono .......... A01D 42/005 56/320.2 |

* cited by examiner

MOWER CUTTING CHAMBER WITH ADJUSTABLE DISCHARGE GEOMETRY

RELATED APPLICATIONS

This application claims the benefit of U.S. Provisional Patent Application No. 61/845,740 filed on Jul. 12, 2013 which is incorporated herein by reference.

FIELD OF THE INVENTION

This invention relates to a mower cutting chamber having adjustable baffles for controlling the discharge of grass clippings.

BACKGROUND

The cutting chambers of riding lawn mowers can discharge large amounts of grass clippings at high rates, particularly as mower sizes and speeds increase. Typically, a cutting chamber has a rotating cutting blade which cuts grass primarily at its tips, and also functions like a fan or blower by powering a vortex of rotating air inside the cutting chamber. This cutting chamber vortex lifts and transports grass clippings around the periphery of the cutting chamber above the cutting blade until the grass clippings are blown out through a discharge opening in the side of the cutting chamber. Of concern here is the discharge of grass clippings from a cutting chamber. A side discharge mower can evenly broadcasts clippings across the turf as the mower moves forward because, if the clippings are broadcast in a direction that is generally perpendicular to the direction in which the mower is moving. In some other side discharge configurations, however, it is desirable to further control or fan the clippings over a particular area or into a particular distribution. With a rear discharge mower, grass clippings may tend be dispersed unevenly or possibly distributed in windrows behind the mower. These results occur because the direction in which grass clippings are discharged is generally parallel to the path of the mower.

In the case of a rear discharge cutting deck, the outboard side of a discharge opening is usually defined by a straight, tangentially extending portion of the sidewall of the cutting chamber. The rotating grass clippings follow the straight portion of the sidewall and exit the cutting chamber through the discharge opening. It is usually preferable to spread grass clippings as evenly as possible. But, the distribution of grass clippings depends on the type of grass, the length of the clippings and the moisture content or density of the clippings. If the discharge opening has a fixed geometry, then, in some situations, the clippings will accumulate in windrows, or the clippings will be deposited in clumps. What is needed is a discharge opening that can be adjusted to compensate for different types of grass clippings, different types of mowing conditions, and different types of mowing deck geometries so that grass clippings can be manipulated, in order to focus the grass clippings or distribute them as evenly as possible.

SUMMARY

The above stated need is addressed by a mower cutting chamber which includes an adjustable cut-off baffle and a movable spreader plate. The cutting chamber is defined by an upper wall and a sidewall. The cutting chamber also includes a discharge opening and a spindle-mounted cutting blade. The sidewall extends around the cutting chamber between a first edge and a second edge which is spaced away from the first edge. The first and second edges of the sidewall define a discharge opening. In this example, a cut-off baffle is disposed between the spindle and the sidewall. The cut-off baffle presents a baffle flange that extends generally toward the discharge opening. In this example, the cut-off baffle may be adjusted between an open position in which the cut-off baffle does not obstruct at least a portion of the discharge opening and a closed position in which the cut-off baffle obstructs the discharge opening to a greater degree than when the cut-off baffle is in the open position. In this example, a spreader plate is mounted adjacent to the sidewall near the second edge of the sidewall. The location of the spreader plate may be adjusted between a first retracted position in which the spreader plate is spaced away from the discharge opening and a second extended position in which the spreader plate is closer to the discharge opening than when it is in the first position.

DETAILED DESCRIPTION

Figure 1:
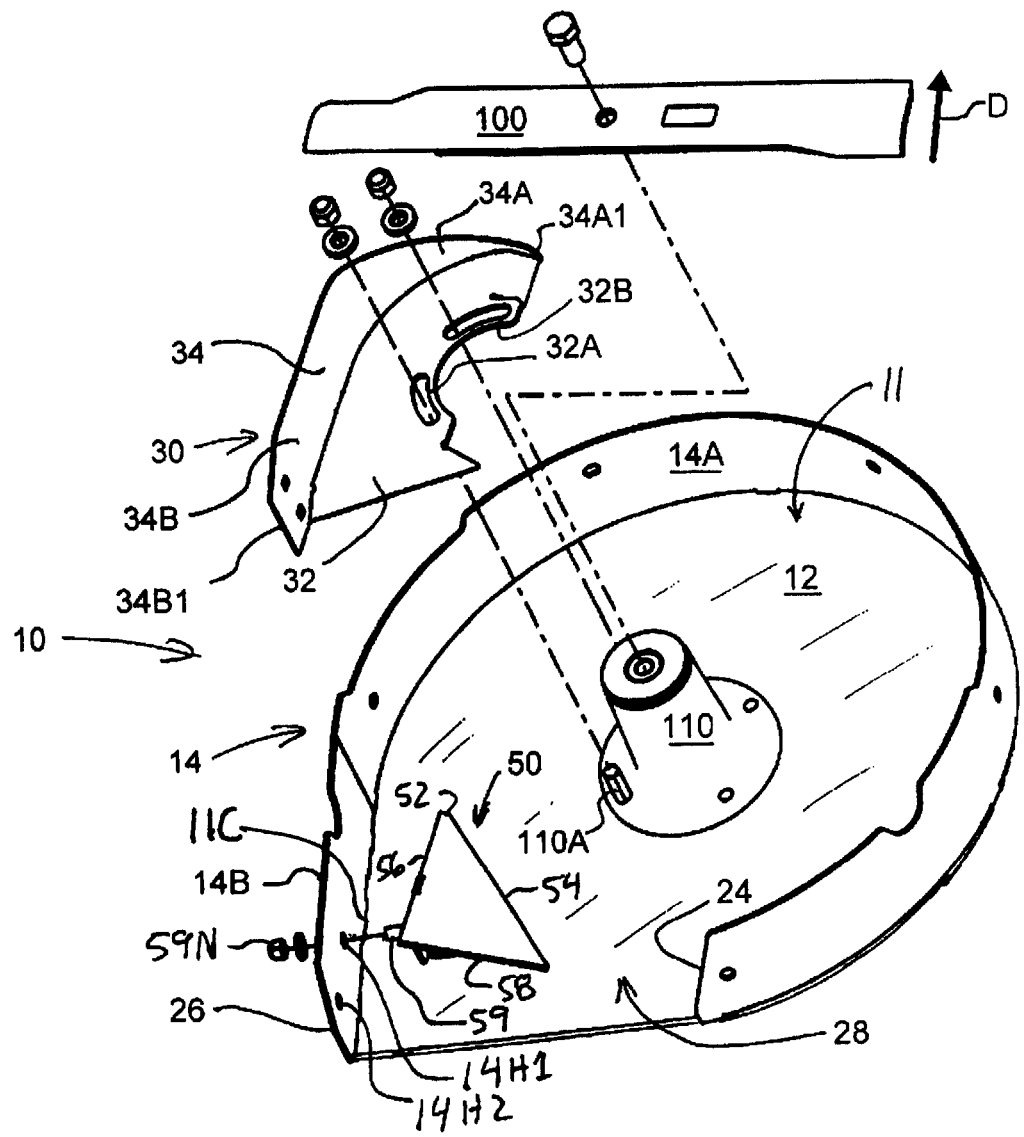
FIG. 1 is an exploded perspective view of one embodiment of the mower deck generally looking up from under the mower cutting chamber.

Referring to the drawings, FIG. 1 shows an example embodiment of a mower deck 10 having a cut-off baffle 30 and a spreader plate 50. Mower deck 10 includes a cutting chamber 11 that is defined by an upper wall 12 and a sidewall 14. Cutting chamber 11 also includes a discharge opening 28 and a cutting blade 100 that is mounted to spindle 110 to rotate in the direction indicated by arrow D. All of the views of mower deck 10 are shown as if the mower has been turned over to expose the underside of mower deck 10.

As noted above, cutting chamber 11 is defined by an upper wall 12 and a sidewall 14. As can be seen in FIG. 1, sidewall 14 extends around the outer extent of cutting chamber 11 between a first edge 24 and a second edge 26. Sidewall 14 presents an arc-shaped sidewall portion 14A as it extends from first edge 24 around most of cutting chamber 11 in the direction of rotation D of cutting blade 100. In this example, a straight portion 14B extends tangentially from the end of the arc-shaped portion 14A which is opposite from first edge 24. As is shown in FIG. 1, straight sidewall portion 14B terminates at second edge 26. Straight portion 14B and upper wall 12 also define a cutting chamber upper corner 11C. First and second edges 24 and 26 of sidewall 14 and upper wall 12 define discharge opening 28, which, in this example is positioned at the rear of cutting chamber 11 thus providing a rear discharge opening. Grass clippings (not shown), which are generated when cutting blade 100 cuts grass, are typically blown around the periphery of cutting chamber 11 at a level that is typically above cutting blade 100 in the blade rotation direction indicated by arrow D in FIG. 1 and are subsequently discharged from cutting chamber 11 through discharge opening 28.

Before considering cut-off baffle 30 and spreader plate 50, we should consider the movement of grass clippings in cutting chamber 11 and the discharge of grass clipping from cutting chamber 11. The vortex-like motion of these grass clippings in a cutting chamber is powered by the rotation of cutting blade 100. As cutting blade 100 rotates in the direction indicated by arrow D, the grass clippings (not shown), which may be envisioned as lightweight particles, are carried by a rotating stream of moving air which is powered by blade 100. Most likely, it is because the grass clippings have some mass, centrifugal force causes them to move toward sidewall 14 as they swirl around cutting chamber 14. Because cutting blade 100 tends to pull air up from the ground, most of the orbiting grass clippings are above cutting blade 100. When the orbiting stream of air carrying the grass clippings encounters straight portion 14B, the stream of air and the grass clippings exit cutting chamber 11 through discharge opening 28. Since cutting chamber 11 is open at the bottom, the air and the grass clippings for supplying the stream of air and the entrained grass clippings is constantly re-supplied by more air and more grass clippings. To some extent, cutting blade 100 functions as a fan blade which powers the movement of air as described above. Accordingly, grass clippings are picked up and blown around and out of cutting chamber 11 as described above.

Figure 2:
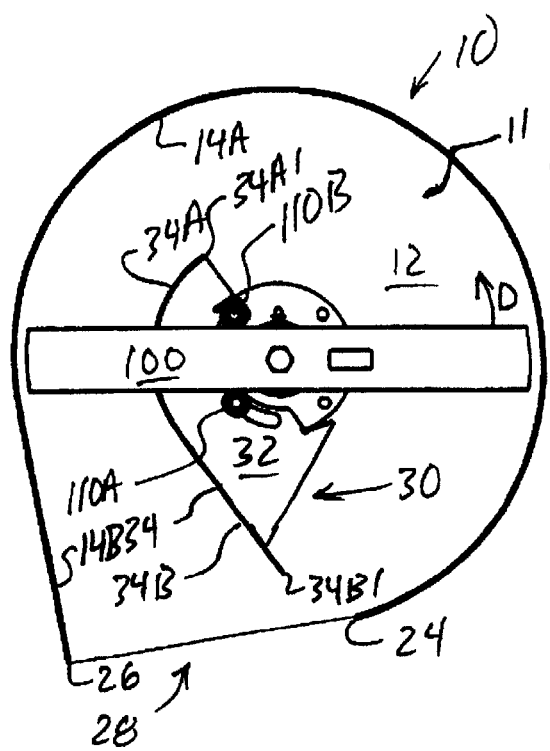
FIG. 2 is a bottom view of one embodiment of the mower deck showing a cut-off baffle in an open position with the spreader plate removed for clarity.
Figure 3:
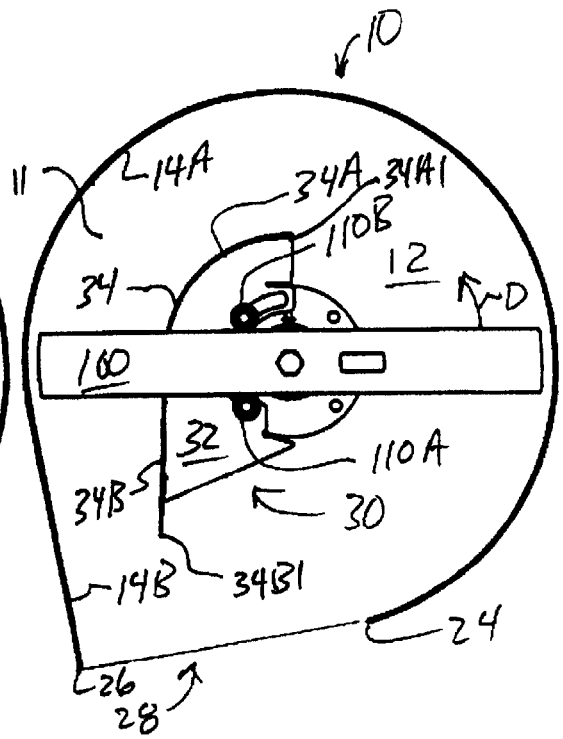
FIG. 3 is a bottom view of one embodiment of the mower deck showing the cut-off baffle in a closed position with the spreader plate removed for clarity.
Figure 4:
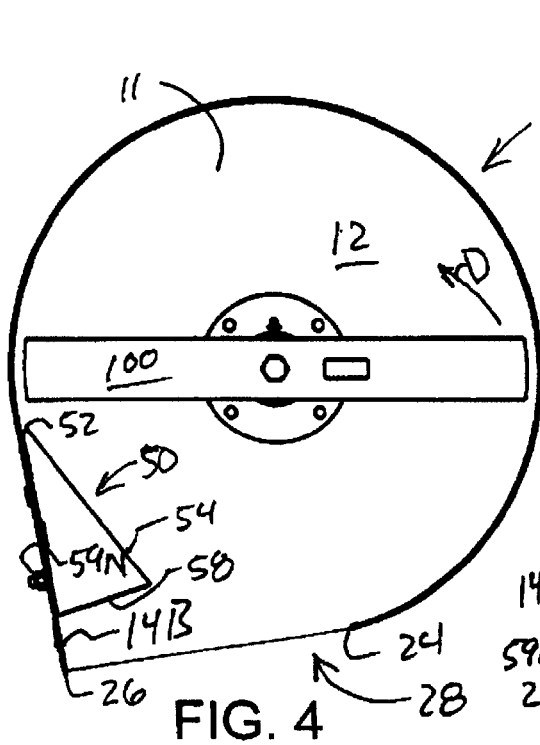
FIG. 4 is a bottom view of one embodiment of the mower deck showing a spreader plate in a retracted position with the cut-off baffle removed for clarity.
Figure 5:
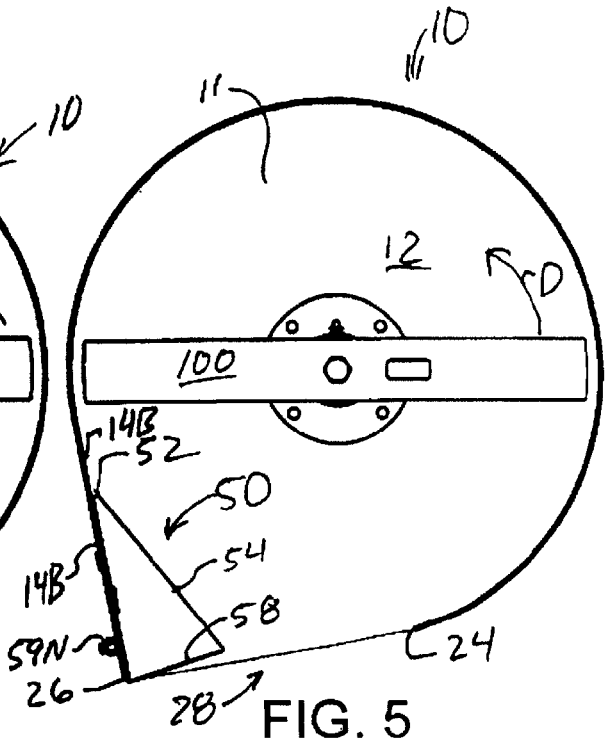
FIG. 5 is a bottom view of one embodiment of the mower deck showing the spreader plate in an extended position with the cut-off baffle removed for clarity.
Figure 6:
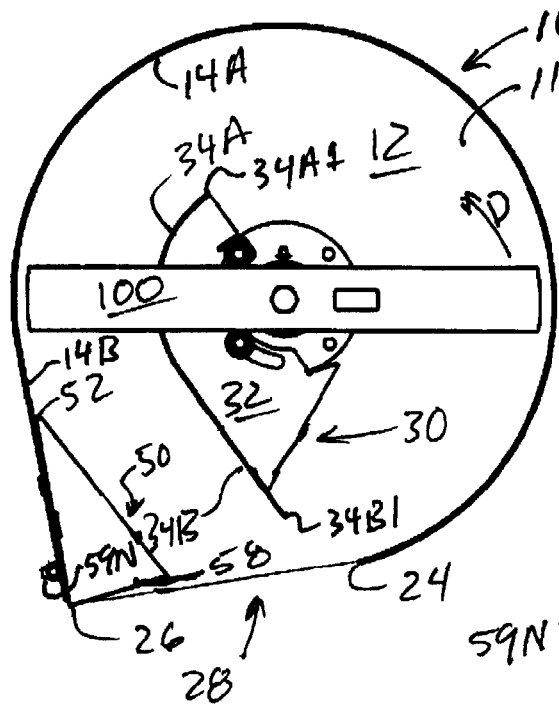
FIG. 6 is a bottom view of one embodiment of the mower deck showing the spreader plate in the extended position and the cut-off baffle in the open position.
Figure 7:
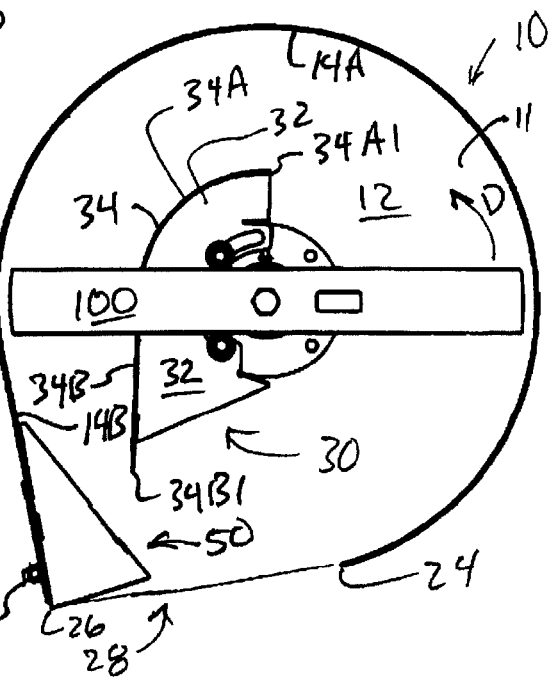
FIG. 7 is a bottom view of one embodiment of the mower deck showing the spreader plate in the extended position and the cut-off baffle in the closed position.
Figure 8:
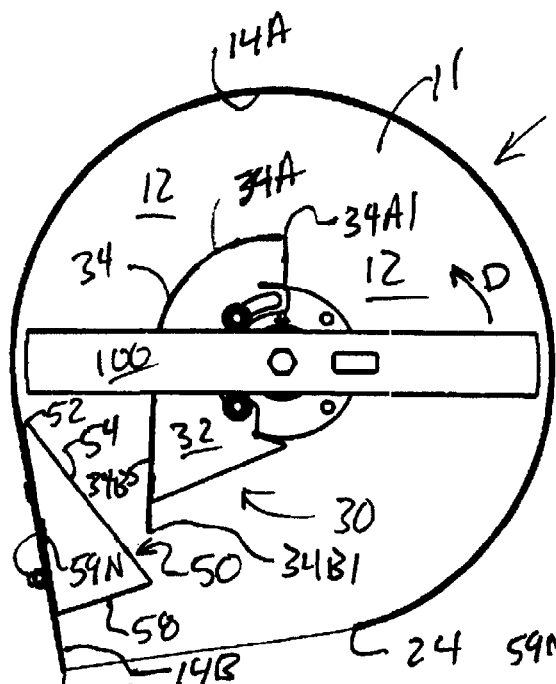
FIG. 8 is a bottom view of one embodiment of the mower deck showing the spreader plate in the retracted position and the cut-off baffle in the closed position.
Figure 9:
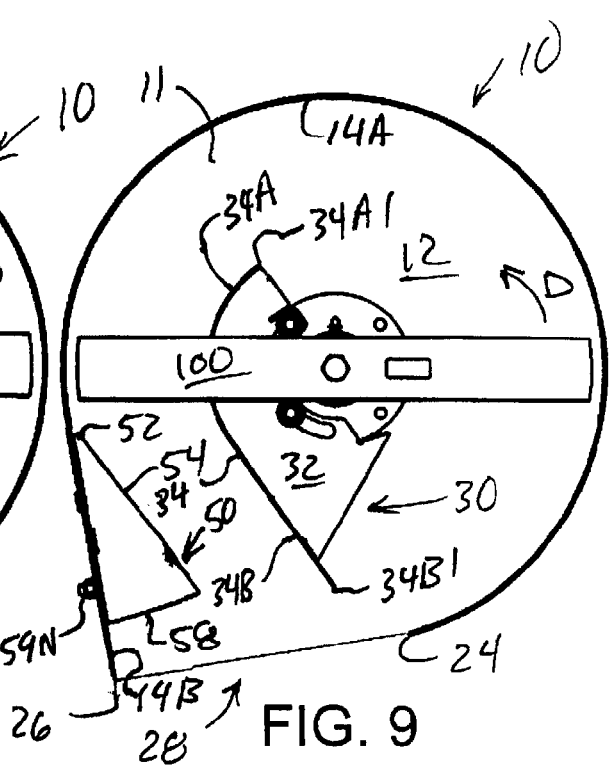
FIG. 9 is a bottom view of one embodiment of the mower deck showing the spreader plate in the retracted position and the cut-off baffle in the open position.

In this example, cut-off baffle 30 is situated between spindle 110 and sidewall 14. Cut-off baffle 30 has a base flange 32 and a baffle flange 34. In this example, base flange 32 lies flat against upper wall 12 of cutting chamber 11. Base flange 32 presents two arc-shaped slots 32A and 32B that receive bolts 110A and 110B. In this example, bolts 110A and 110B are associated with spindle 110 and extend down from upper wall 12. Adjustment mechanisms, such as arc-shaped slots 32A and 32B make it possible to rotatably adjust the position of cut-off baffle 30 by turning it relative to spindle 110. Baffle flange 34 has two portions, an arc-shaped portion 34A and a generally straight portion 34B. As can be seen in FIG. 1, arc-shaped portion 34A is spaced away from spindle 110. In this example, arc-shaped portion 34A extends down from base flange 32 and progressively increases in height in the direction of rotation D of cutting blade 100 from a first end 34A1 until it transitions into straight portion 34B. Straight portion 34B extends tangentially from the end of arc-shaped portion 34A that is opposite first end 34A1 to an outboard edge 34B1. Straight portion 34B also extends down from base flange 32 to a lower edge 34B2. Lower edge 34B2 of straight portion 34B must necessarily be set above blade 100 so that no portion of cut-off baffle 30 interferes with the rotation of cutting blade 100. When bolts 110A and 110B are loosened, it is possible to turn cut-off baffle 30 to adjust its position between a first open position shown in FIG. 2 and a second closed position shown in FIG. 3. Also, in this example, when cut-off baffle 30 is in the open position shown in FIG. 2, straight portion 34B of cut-off baffle 30 is directed generally toward first edge 24 of sidewall 14. When cut-off baffle 30 is in the open position shown in FIG. 2, discharge opening 28 is mostly unobstructed and air and clippings are able to leave the chamber easily at a relatively low velocity. In this example, when cut-off baffle 30 is in the closed position, most of discharge opening is obstructed. More generally, when cut-off baffle 30 is in the closed position, a larger portion of discharge opening 28 is obstructed than when cut-off baffle 30 is in the open position. When a desired position for cut-off baffle 30 has been selected, bolts 110A and 110B are tightened to secure cut-off baffle 30 in the selected position.

In this example, spreader plate 50 is a triangular plate having a base edge 58 and two side edges 54 and 56 which converge at an apex 52. As shown in FIGS. 1, 4, 5, 6-9, in this example, plate 50 is preferably fitted into cutting chamber upper corner 11C (indicated in FIG. 1) so that spreader plate 50 lies over a portion of upper corner 11C as so that base edge 58 is situated between apex 52 and discharge opening 28. Spreader plate 50 may be adjustably located between a first retracted position shown in FIGS. 4, 8 and 9 and a second extended position shown in FIGS. 5, 6 and 7. In this example, as can be seen in FIG. 1, spreader plate 50 is secured in the first retracted position by a bolt 59 projecting from spreader plate 50 that passes through a first hole 14H1 in straight portion 14B of sidewall 14 and a nut 59N which is threaded onto bolt 59. When in the first retracted position, spreader plate 50 is spaced away from discharge opening 28. When in the second extended position, in this example, spreader plate 50 is preferably secured by bolt 59 that passes through a second bolt hole 14H2. When in the second extended position, spreader plate 50 is closer to discharge opening 28 than when it is in the first position. When spreader plate 50 is in the retracted position shown in FIG. 4, it will come in contact with grass clippings that are exiting cutting chamber 11. The grass clippings will impact upon spreader plate 50 and will break up and disperse. Thus, spreader plate 50, particularly when in the retracted position, causes grass clippings to break apart prior to exiting cutting chamber 11.

For most typical average turf compositions, in terms of height of the turf, thickness and moisture content or density, spreader plate 50 is placed in the retracted position and cut-off baffle 30 is placed in a position that is generally halfway between the closed position and the open position.

Other configurations may be advantageous if grass clippings are thick, have high moisture content and are dense. When such high moisture content, dense clippings are exiting cutting chamber 11, they will tend to concentrate toward second edge 26 of discharge opening 28. Accordingly, for such dense clippings, it is usually preferable to have spreader plate 50 in the retracted position and cut-off baffle 30 in the open position. The dense clippings that are heading toward second edge 26 will impact upon spreader plate 50 and then fan out. And, as the dense clippings fan out, it is preferable to have cut-off baffle 30 in the open position so that the clippings can fan out rapidly and as widely as possible as they exit through discharge opening 28. Because, the clippings are dense, they will fall out of the air stream relatively quickly. The object of this configuration is to use the refracted spreader plate to disrupt and disperse what would otherwise be clumps of heavy, dense clippings and to allow those clippings to exit in as wide a pattern as possible prior to their rapid descent to the surface of the turf Still other configurations may be preferred if the grass clippings are thin, dry and of low density. Such clippings will tend to remain in moving air longer. When clippings are thin, dry or less dense, it may be preferable to have spreader plate 50 in the extended position and cut-off baffle 30 in the closed position. Dry, low density clippings are carried by moving air more readily and do not tend to stick together. Thin, dry, low density clippings behave like confetti or small light particles when carried by an air stream. Thus, with spreader plate 50 extended (or aft) and cut-off baffle 30 closed, the dry, low density clippings leave discharge opening 28 at a relatively high velocity with the exiting air stream. The air stream and the clippings fan out from the mower so that the thin, dry or low density clippings are broadcast in a generally uniform pattern away from the cutting chamber.

From the above description the skilled reader can see how cutting chamber 11 with adjustable cut-off baffle 30 and movable spreader plate 50 provides a mower deck having a discharge opening which may be adjusted to accomplish the greatest flexibility for a wide range of turf cutting conditions. It is preferable that such a mower is not be limited to a particular type of turf growing in a particular region having a particular rainfall pattern. Such a mower is preferably capable of handling a wide range of turf and moisture conditions. Such a mower may also be preferable for certain rear discharge deck configurations. With the adjustable elements described above, an operator is able to, in most cases, deposit grass clippings in a generally uniform manner regardless of the type and length of the turf and the moisture content and density of the turf.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A mower deck for a turf mower, comprising:
   (a) at least one cutting chamber with a cutting blade spindle and a rotary cutting blade mounted to the cutting blade spindle, the cutting chamber having an upper wall and an outer extent bounded at least partially by a sidewall, the sidewall presenting a discharge opening defined by a first edge, an opposite second edge and the upper wall, the sidewall adjacent the second edge and the upper wall defining a cutting chamber upper corner,
   (b) a cut-off baffle rotatably mounted at the cutting blade spindle and including a baffle flange that extends toward the discharge opening, the cut-off baffle being able to be adjusted such that the cut-off baffle may be secured between an open position wherein at least most of the discharge opening is not obstructed by the cut-off baffle and a closed position in which more of the discharge opening is obstructed by the cut-off baffle, and,
   (c) a spreader plate lying over a portion of the cutting chamber upper corner, the spreader plate being triangular in shape and having an apex, a base edge and two side edges which extend away from the base edge and meet at the apex, the spreader plate being disposed in the cutting chamber upper corner such that the apex is adjacent to the cutting chamber upper corner and is farther from the discharge opening than the base edge and such that one of the side edges lies against the upper wall and the other of the side edges lies against the sidewall, the position of the spreader plate being adjustable between a first retracted position in which the spreader plate is spaced away from the discharge opening and a second extended position in which the spreader plate is closer to the discharge opening than when the spreader plate is in the retracted position.

2. The mower deck of claim 1, wherein:
   the sidewall of the mower deck adjacent to the second edge of the sidewall includes a straight portion and the one side edge of the spreader plate that lies against the sidewall, lies against the straight portion of the sidewall.

3. A mower deck for a turf mower, comprising:
   (a) at least one cutting chamber with a spindle-mounted rotary cutting blade, the cutting chamber defined by a sidewall and an upper wall, the sidewall extending between a first edge and a second edge and encompassing most of the cutting chamber, the sidewall including a generally straight portion that terminates at the second edge, the first edge, the second edge and the upper wall defining a discharge opening, the straight portion and the upper wall defining a cutting chamber upper corner,
   (b) a cut-off baffle disposed between the sidewall and the spindle, the cut-off baffle including a baffle flange which extends toward the cutting chamber sidewall, the cut-off baffle being rotatably adjustable between an open position in which at least most of the discharge opening is not obstructed by the baffle flange and a closed position in which the baffle flange obstructs the discharge opening to a greater degree than when the cut-off baffle is in the open position,
   (c) a spreader plate lying over a portion of the cutting chamber upper corner, the spreader plate having a base edge and two side edges extending from the base edge and meeting at an apex, the spreader plate oriented such that the apex of the spreader plate is adjacent to the upper corner and such that the base edge is situated between the apex and the discharge opening and such that one of the two side edges lies against the upper wall of the cutting chamber and the other of the two side edges lies against the straight portion of the sidewall, the spreader plate being adjustable between a first retracted position in which the spreader plate is spaced away from the discharge opening and a second extended position in which the spreader plate is closer to the discharge opening than when the spreader plate is in the retracted position.

4. The mower deck of claim 3, wherein:
   the cut-off baffle includes an arc-shaped portion that is spaced away from the spindle and the baffle flange extends tangentially from the arc-shaped portion.

5. A mower deck for a turf mower, comprising:
   (a) at least one cutting chamber with a cutting blade spindle and a rotary cutting blade mounted to the cutting blade spindle, the cutting chamber having an upper wall and an outer extent bounded at least partially by a sidewall, the sidewall presenting a discharge opening defined by a first edge, an opposite second edge and the upper wall, the sidewall adjacent the second edge and the upper wall defining a cutting chamber upper corner,
   (b) a cut-off baffle rotatably mounted at the cutting blade spindle and including a baffle flange that extends toward the discharge opening, the cut-off baffle being able to be adjusted between an open position wherein at least most of the discharge opening is not obstructed by the cut-off baffle and a closed position in which more of the discharge opening is obstructed by the cut-off baffle, and, (c) a spreader plate lying over a portion of the cutting chamber upper corner adjacent to the discharge opening, the spreader plate including a base edge and two side edges which extend away from the base edge, the spreader plate being mounted in the upper corner of the cutting chamber adjacent to the discharge opening so that the base edge is oriented towards the discharge opening, the position of the spreader plate being slidably adjustable between a first retracted position in which the spreader plate is spaced away from the discharge opening and a second extended position in which the spreader plate is closer to the discharge opening than when the spreader plate is in the retracted position.

6. The mower deck of claim 5, wherein:

the sidewall of the mower deck adjacent to the second edge of the sidewall includes a straight portion and the spreader plate is mounted in the cutting chamber such that one side edge lies against the upper wall of the cutting chamber and the other side edge lies against the straight portion of the sidewall of the cutting chamber.

* * * * *